July 17, 1962 C. E. WEBB ET AL 3,044,122
METHOD OF MOLDING ARTICLES OF MICROCELLULAR MATERIAL
Filed Dec. 4, 1958 16 Sheets-Sheet 1

Charles E. WEBB
Wallace G. HAWKINS
INVENTORS

BY:
Wenderoth, Lind & Ponack
ATTORNEYS

INVENTORS:
Charles E. WEBB
Wallace G. HAWKINS
BY: Wenderoth, Lind + Ponack
ATTORNEYS

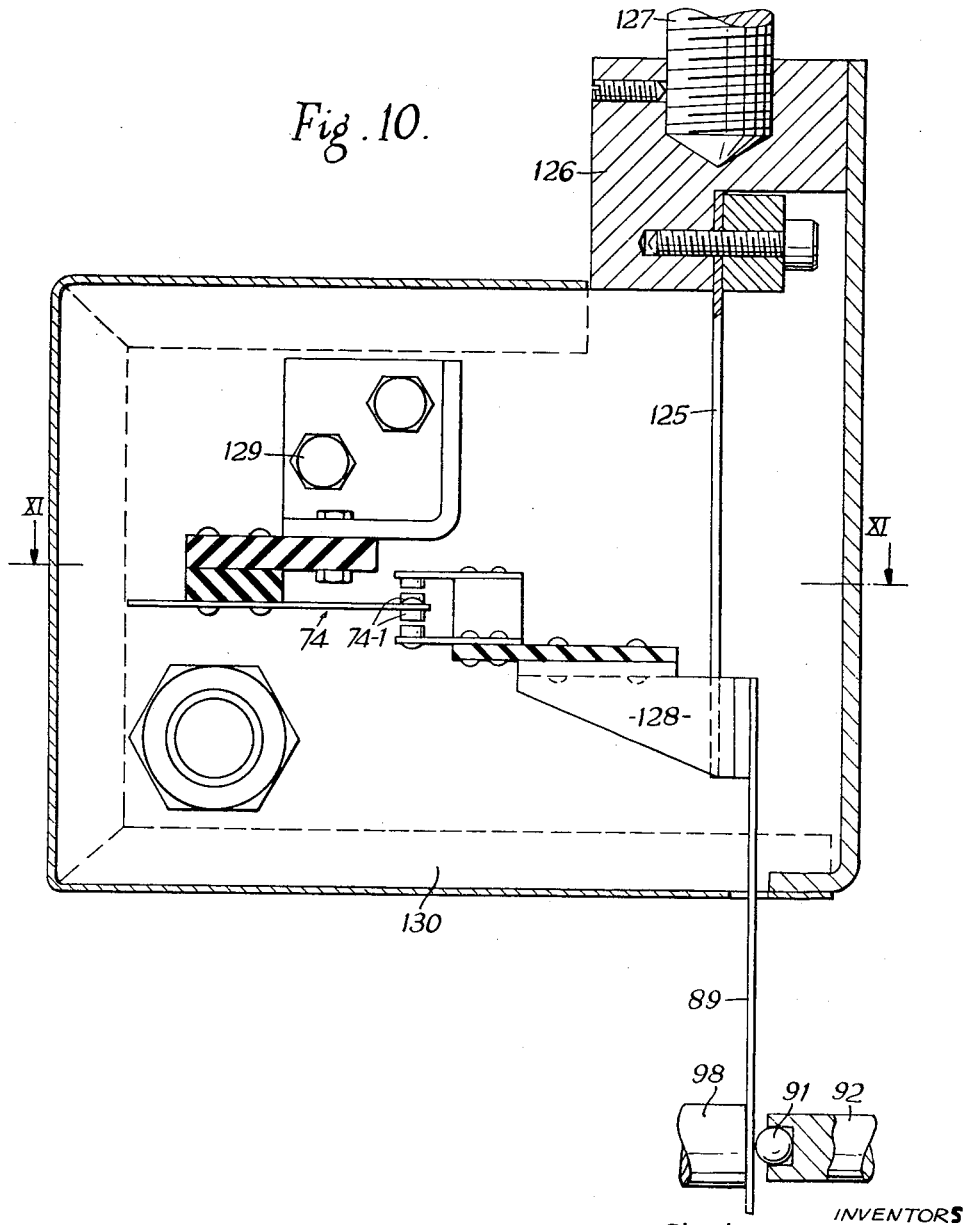

July 17, 1962   C. E. WEBB ET AL   3,044,122
METHOD OF MOLDING ARTICLES OF MICROCELLULAR MATERIAL
Filed Dec. 4, 1958   16 Sheets-Sheet 10

INVENTORS
Charles E. WEBB
Wallace G. HAWKINS
BY:
Wenderoth, Lind & Ponack
ATTORNEYS July 17, 1962 C. E. WEBB ET AL 3,044,122
METHOD OF MOLDING ARTICLES OF MICROCELLULAR MATERIAL
Filed Dec. 4, 1958 16 Sheets-Sheet 15

INVENTORS
Charles E. WEBB
Wallace G. HAWKINS
BY:
Wenderoth, Lind & Ponack
ATTORNEYS

United States Patent Office 3,044,122
Patented July 17, 1962

3,044,122
METHOD OF MOLDING ARTICLES OF MICROCELLULAR MATERIAL
Charles E. Webb, Glastonbury, and Wallace G. Hawkins, Ashcott, near Bridgwater, England, assignors to C.I.C. Engineering Limited, Somerset, England, a British company
Filed Dec. 4, 1958, Ser. No. 778,257
5 Claims. (Cl. 18—48)

This invention relates to moulding of articles in microcellular rubber and similar elastomeric substances.

The moulding and simultaneous vulcanising of microcellular rubber has been attended with difficulty on account of the tendency of the rubber to expand after the moulded product has been removed from the mould, this expansive tendency being caused by the formation during moulding of nitrogen gas, which is compressed to provide extremely small separate cells—microcells—as pressure is maintained.

The object of this invention is to compensate for the above-mentioned tendency to expansion and with this object in view the present invention provides a method of and means for moulding and simultaneously vulcanising articles in microcellular rubber or a similar elastomeric substance, which is characterised by the step of controlling the moulding process in such a manner as to ensure unidirectional expansion of the vulcanising mass. More particularly the improved method and means provides for the step of slightly increasing the volumetric capacity of the moulding cavity by a pre-arranged regulated amount.

One application of the invention is to a machine for moulding and simultaneously vulcanising microcellular rubber masses, said machine being of the kind wherein use is made of relatively movable mould components (operated, for example, by fluid motor units) to form a closed moulding cavity and for the purpose of this invention means are provided in such a machine for slightly increasing the volumetric capacity of the moulding cavity in such manner as to admit of unidirectional expansion only of the microcellular mass.

In one form of machine of this kind for moulding and vulcanising a rubber sole and heel blank on to a shoe upper, the upper to be soled is placed on a last (for instance, a suspended last, that is, with the last bottom facing downwards) and the insole secured to the upper and lying against the last bottom constitutes one of the walls of a closed mould cavity. The remaining walls of the mould cavity are constituted by fluid-operated laterally movable side moulds and a fluid operated vertically movable sole mould.

In applying the present invention to such a machine, fluid control means may be provided to ensure that the sole mould piston withdraws slightly at a controlled rate throughout the vulcanising period. To effect this the fluid control circuit of the machine is so arranged that, on initiation of the vulcanising cycle, the side moulds close together first and the sole mould is then operated, that is, made to ascend if operating in conjunction with a suspended last or made to descend if the last is beneath the sole mould.

Pressure is thus applied to the rubber blank enclosed in the mould cavity and this pressure is maintained for a suitable period according to the nature of the rubber mix used, the size of the blank and other factors, for a period of, for instance, about one to three minutes, as the result of which an accurate moulding is made and effective bonding to the shoe upper secured.

From then on the sole mould gradually withdraws at a controlled (constant or varying) rate until at the end of the operating cycle, which may last, for example, for about nine minutes, the mould cavity has attained to a maximum permitted volume; the side moulds remain stationary during the gradual withdrawal of the sole mould.

The rate of withdrawal is, generally speaking, extremely slow—in one case where the average dwell period (that is, the period during which full pressure is maintained) was about one minute, the rate of sole mould descent amounted to no more than .0058 inch per second, the total descent being approximately five-sixteenths of an inch in a vulcanising period of nine minutes. Other suitable rates of movement can be readily established by simple trial, for example, a full vulcanising pressure maintained for three minutes, may be followed by a three-minute (approx.) descent period, the rate of descent being about .015 inch per minute, giving a total descent of about ⅛ inch.

There are several methods by which the required withdrawal of the sole mould or equivalent mould forming component may be effected, some of which will now be referred to: for convenience the withdrawal movement will be considered as the descent of the sole mould of a shoe sole moulding and vulcanising machine.

Sole mould descent may be effected by a mechanical device, such as a precision screw jack abutting the depending tail of the piston rod of a fluid cylinder unit which provides for the normal mould closing and opening operations. The descent of the jack may be regulated by an electric motor driving through a transmission mechanism including a speed reduction gear; the jack may be of the so-called recirculating ball type and variation in the rate of descent may be provided for in the transmission mechanism.

Another mechanical descent control means could be constituted by a rotating cam engaging directly or indirectly with the tail of the sole mould piston rod. If rapid release of the sole mould is required on the expiry of the vulcanising period, arrangements may be made to remove or nullify the effect of a direct acting cam or to disconnect an intermediary member, such as a rockable beam used with an indirect acting cam. A further mode of descent control may utilize a telescopic strut.

In many cases suitable methods of sole mould descent control would use remote control means. For instance, in a machine using fluid-operated mould components the rate of flow of fluid exhausting from the sole mould cylinder unit could be controlled; for instance, exhaust fluid control could be effected in response to a predetermined movement of a cam-controlled element. Alternatively an additional cylinder unit could be employed to effect sole mould descent. These fluid-operated systems could be controlled automatically by solenoid valves. Other modes of fluid control are by the employment of a metering valve (of fixed orifice or adjustable needle type) interposed in the exhaust line of the sole mould cylinder unit, or by use of a dash-pot mechanism using a separate fluid line so that the dash-pot is in effect isolated from the main pressure fluid, such as oil, which may be influenced to some extent by change in viscosity due to temperature rise attendant on use of oil as the main pressure fluid.

Some different ways in which the main object of this invention may be achieved will now be described, firstly with reference to the accompanying drawings and wherein:

FIGURE 1 shows diagrammatically the main components of a twin-head machine for moulding and simultaneously vulcanising a rubber sole and heel unit to a shoe upper, FIGURE 2 is a detailed sectional view of a suitable form of choke valve, one of the components included in FIGURE 1, FIGURE 3 illustrates another arrangement, shown applied to a shoe sole moulding and vulcanising machine (or one head of a twin head machine), and FIGURE 4 is a detailed sectional view of a modification of part of the mechanism shown in FIGURE 3.

FIGURE 5 is a diagrammatic representation of fluid circuitry suitable for a twin head shoe sole moulding and vulcanising machine, and, FIGURE 6 is a wiring diagram of the associated electrical control system.

FIGURE 7 is a front elevation of a suitable form of cam-actuated switch controls employed in a machine having fluid and electrical circuitry as shown in FIGURES 5 and 6, and FIGURE 8 is a cross section on line VIII—VIII in FIGURE 7, FIGURE 9 is a cross section through a suitable form of one of the valves employed in the fluid circuitry shown in FIGURE 5, FIGURE 10 is a detail view of a switch mechanism operated by a sole ram cylinder unit.

FIGURE 11 is a sectional plan view of the sole mould switch mechanism, on line XI—XI of FIGURE 10.

FIGURE 12 is a perspective view of a known form of shoe sole moulding and vulcanising machine, showing the disposition of the cam-actuated switch controls (FIGURES 7 and 8), the sole mould switch mechanism (FIGURES 10 and 11) and other fluid and electrical components (FIGURES 5 and 6); the machine illustrated employs a suspended last which, for clearness, is not shown in FIGURE 12.

Figure 7:
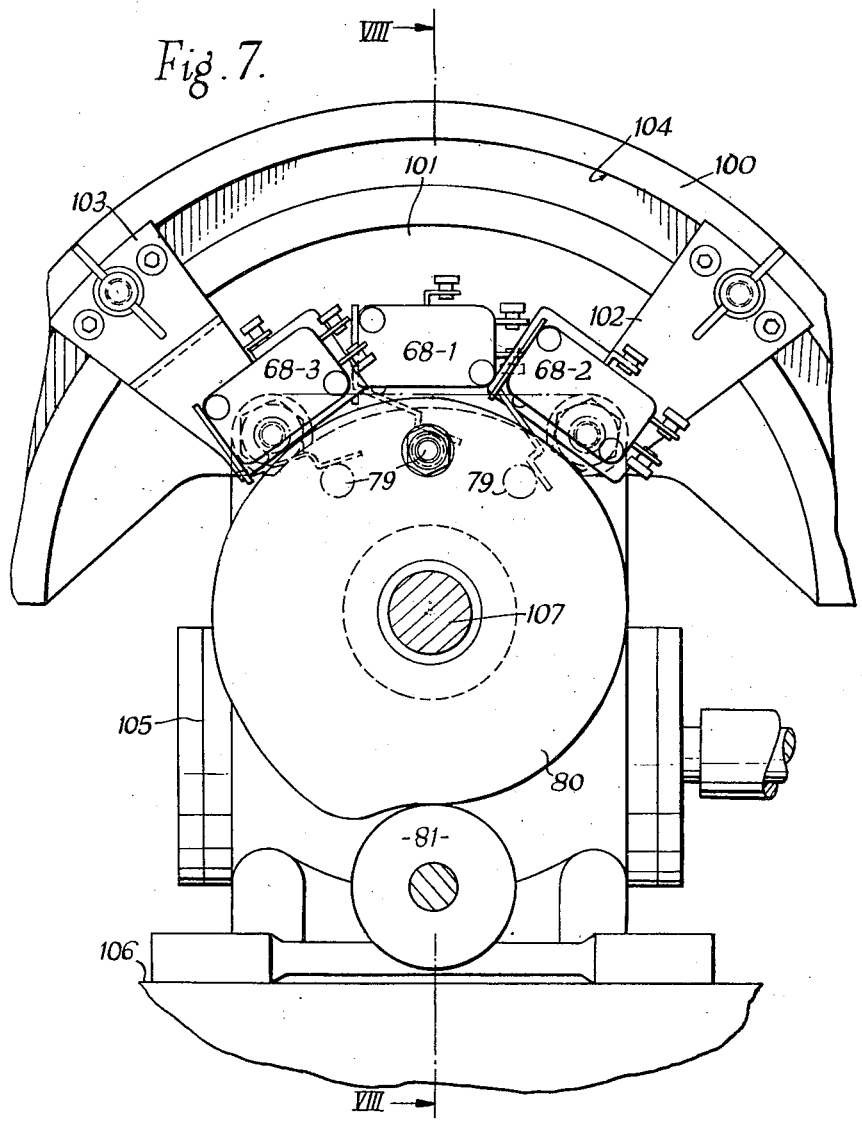
Figure 8:
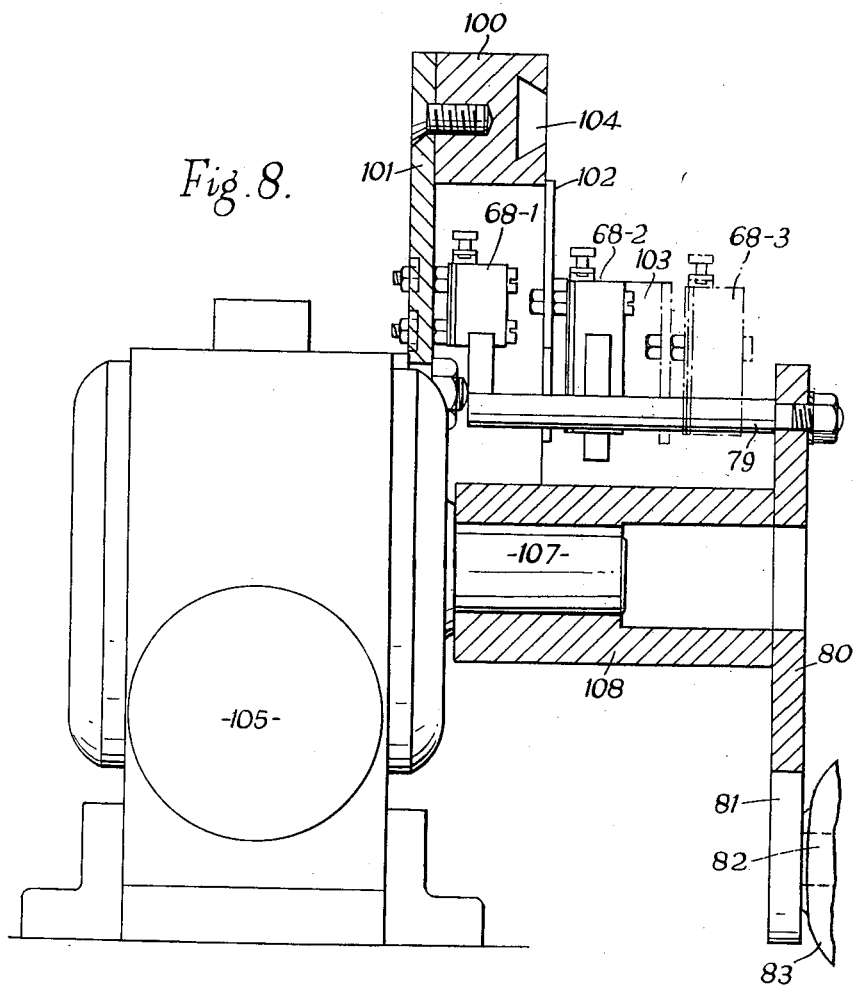
Figure 9:
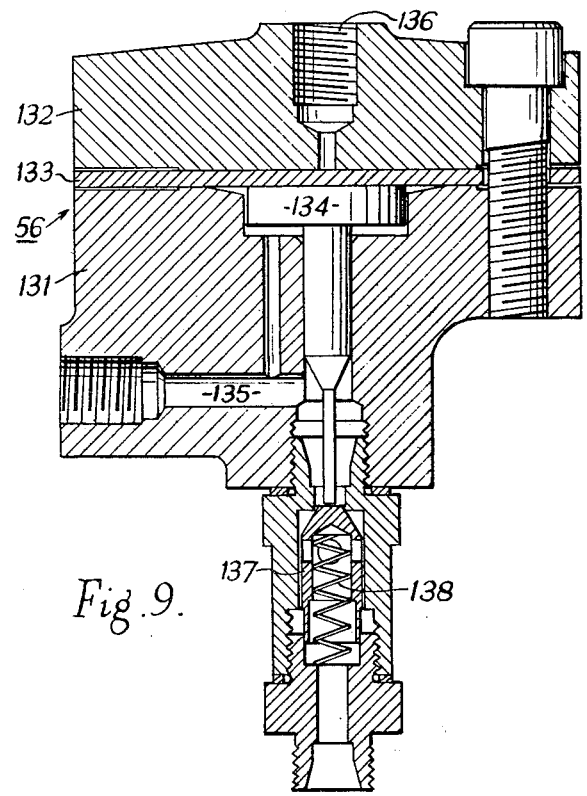
Figure 11:
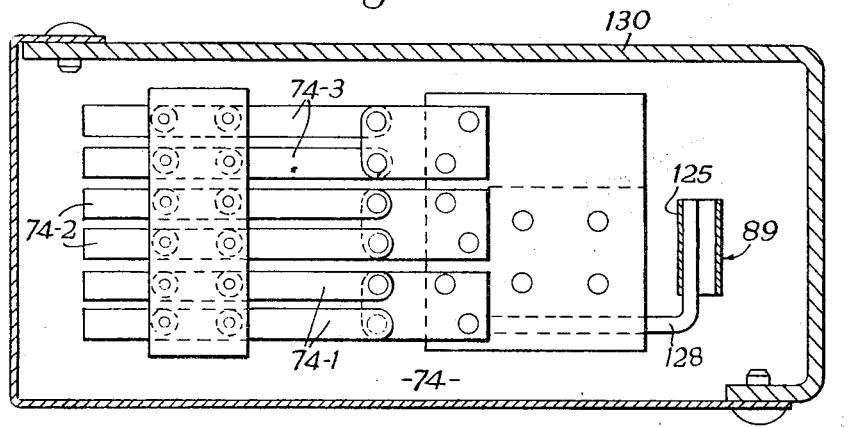
Figure 12:
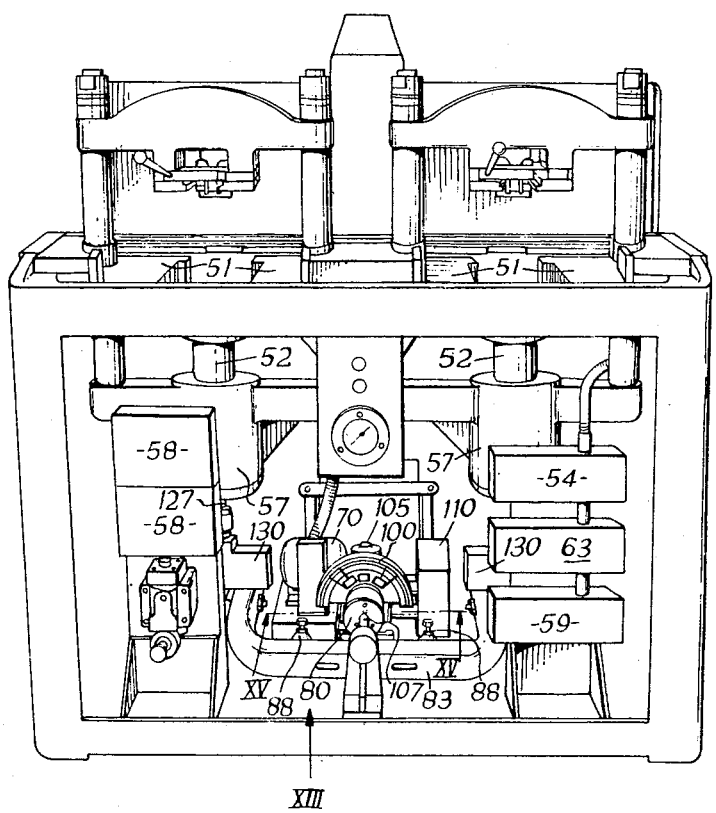
Figure 13:
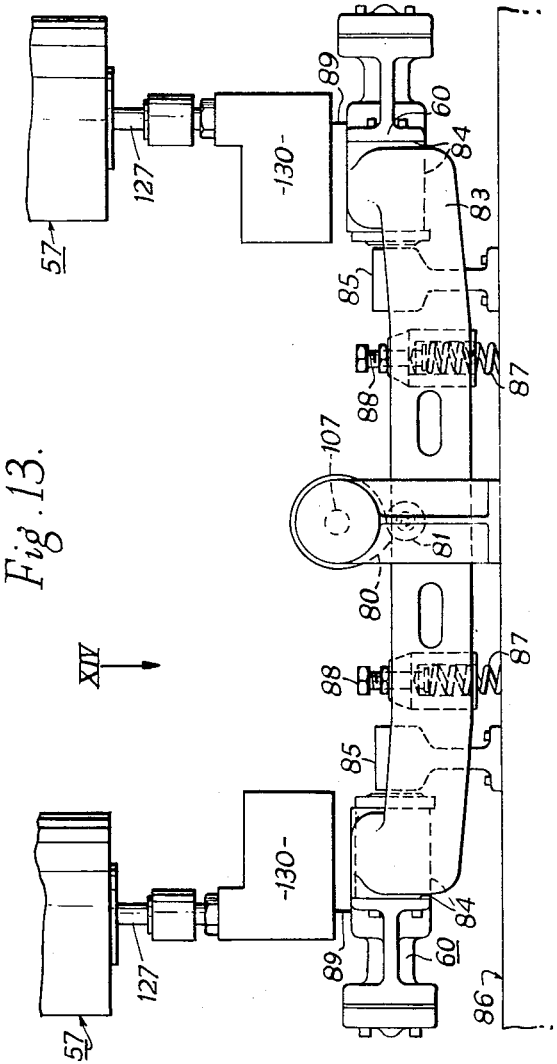
FIGURE 13 is a front view looking in the direction of arrow XIII in FIGURE 12.
Figure 14:
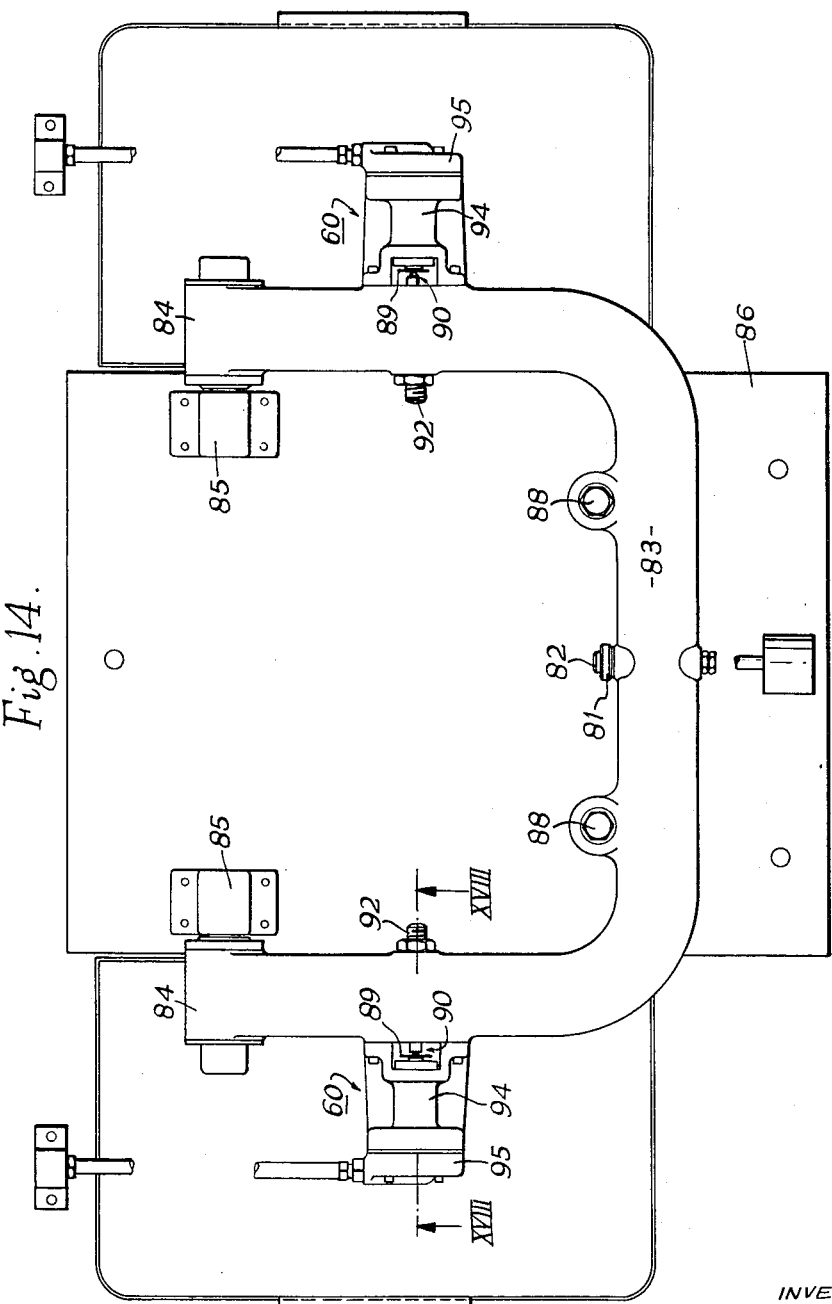
FIGURE 14 is a plan view looking in the direction of arrow XIV in FIGURE 13.
Figure 15:
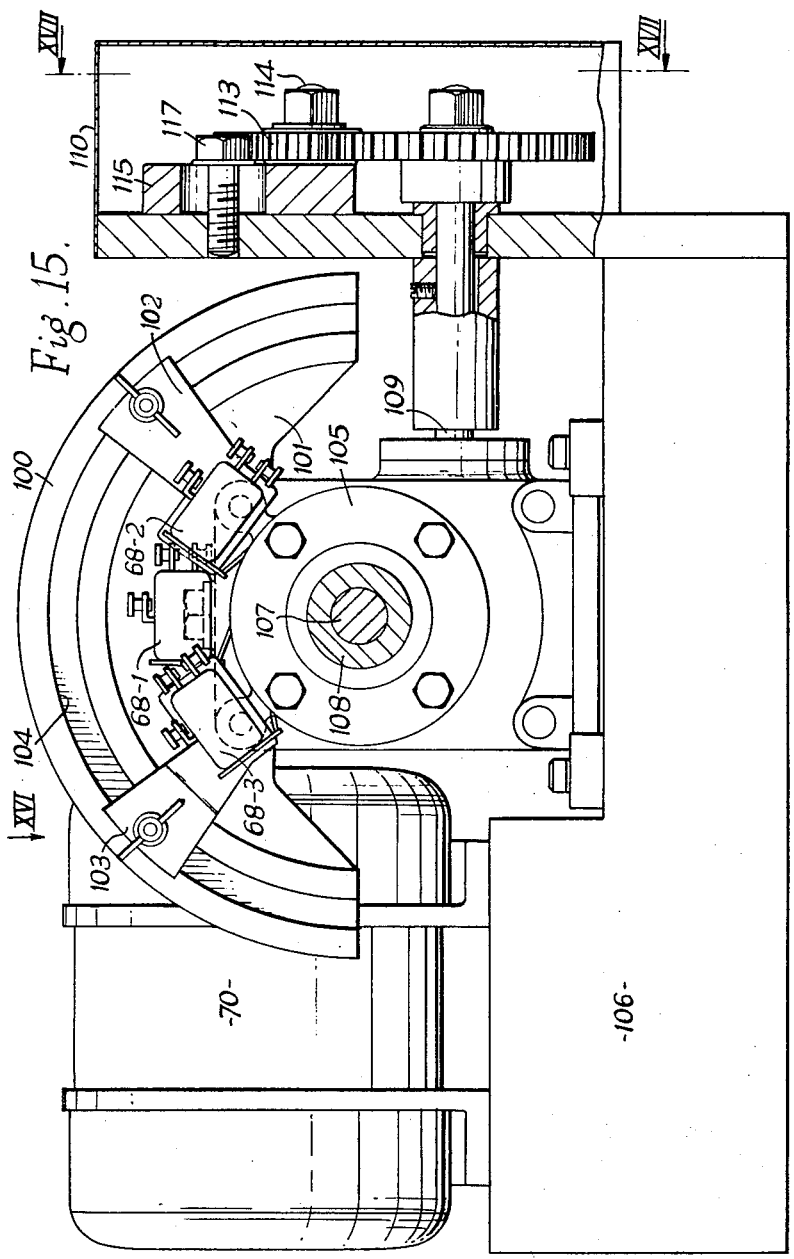
Figure 16:
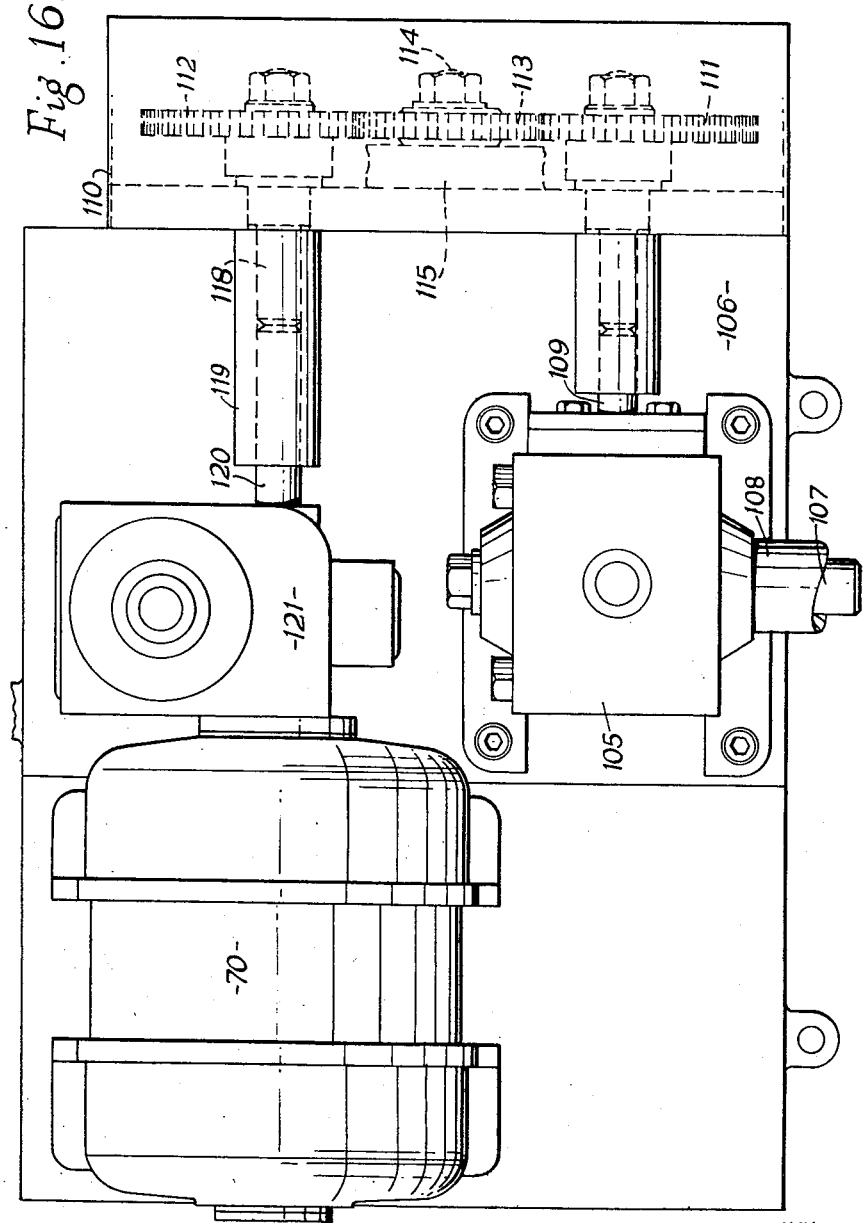
Figure 17:
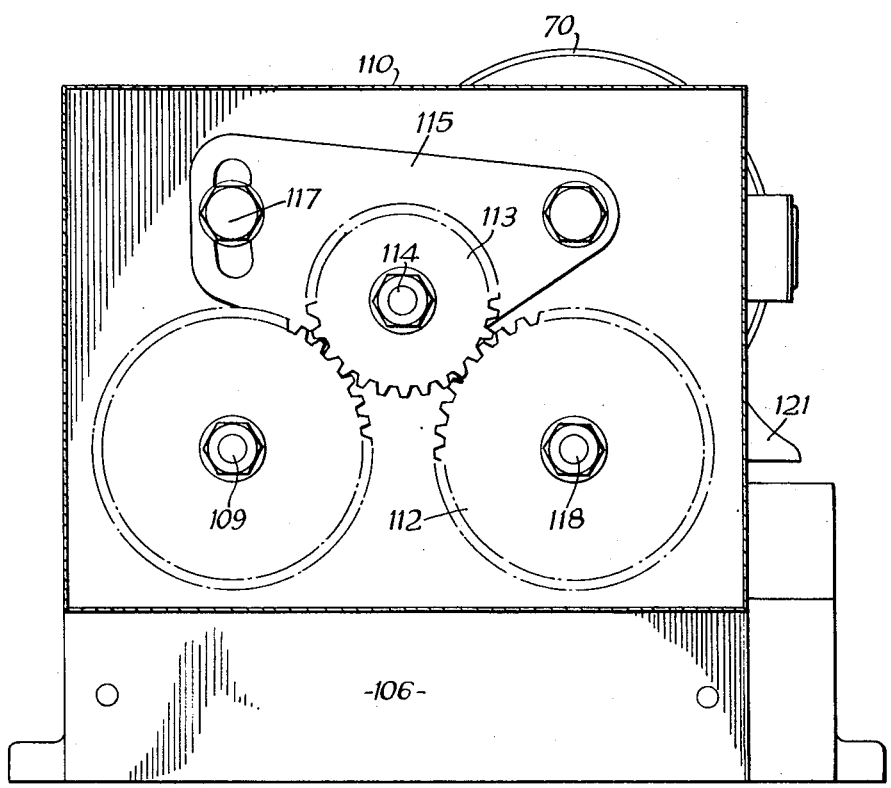
Figure 18:
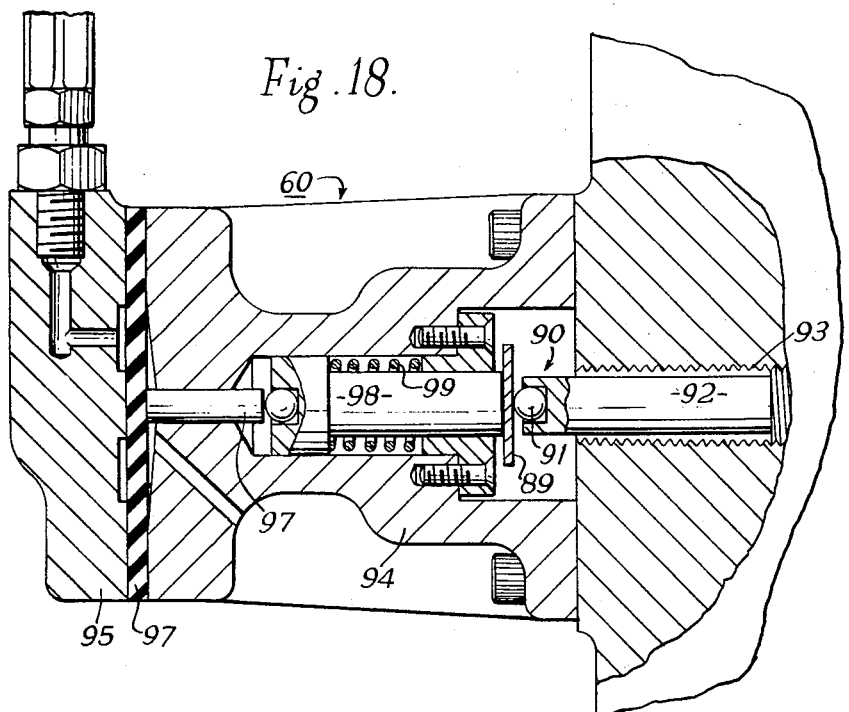
Figures 19A, 19B:
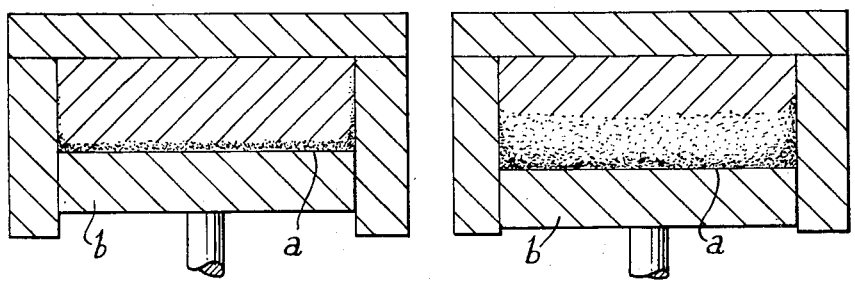
Figure 19C:
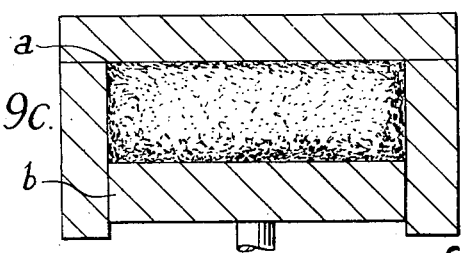

FIGURE 15 is a view similar to FIGURE 7 taken along section line XV—XV in FIGURE 12, and showing additional components not included in FIGURE 7, FIGURE 16 is a plan view looking in the direction of arrow XVI in FIGURE 15, FIGURE 17 is a vertical sectional view on line XVII—XVII of FIGURE 15, FIGURE 18 is a section along line XVIII—XVIII of FIGURE 14, drawn to an enlarged scale, and FIGURES 19A, 19B and 19C are a series of diagrams relating to the production of microcellular masses of varying density.

Figure 1:
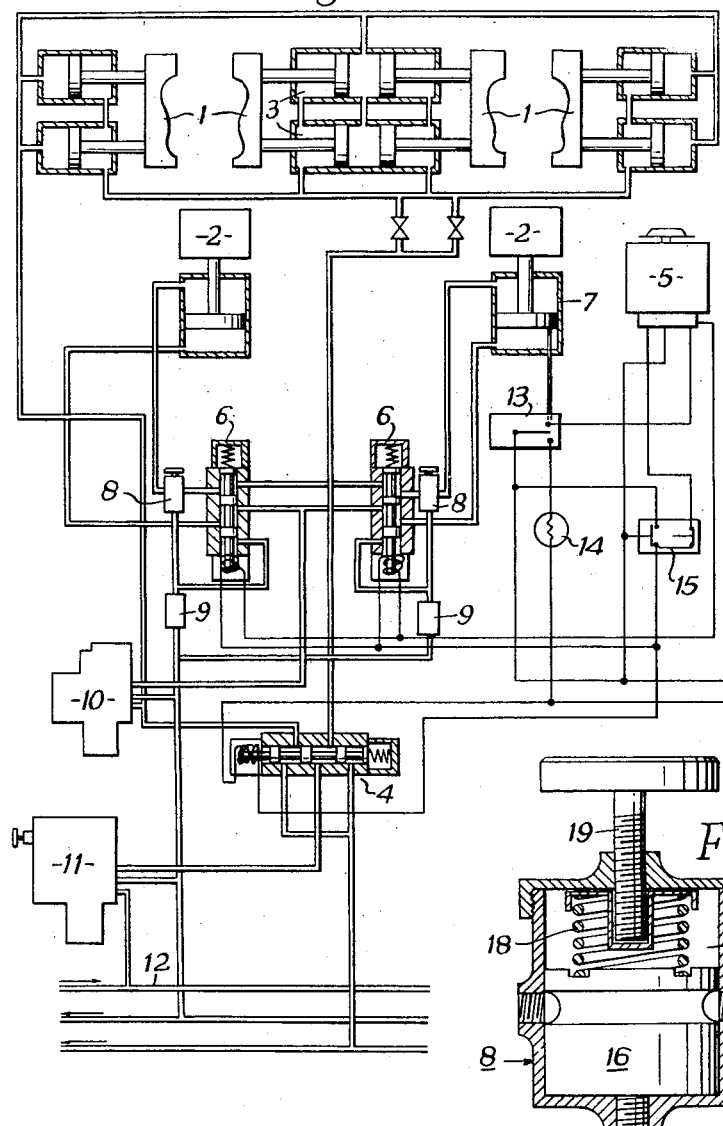

In the machine diagrammatically illustrated in FIGURE 1 each head has a moulding cavity constituted by a last-support upper (with attached insole or equivalent element—not shown), a pair of side moulds 1, and a sole moulding ram 2; the components of the machine are not shown in their correct relative positions.

The side moulds 1 are opened and closed by fluid cylinder units 3, fluid flow to the units 3 being controlled by a solenoid-operated valve 4 electro-magnetically controlled by a timer 5. Pipelines feeding the side mould fluid units 3 are tapped to direct pressure fluid through two solenoid-operated valves 6 which are also under the control of the timer 5 and are connected to opposite ends of fluid cylinder units 7 adapted to reciprocate the rams 2 carrying the sole moulds (not shown).

The valves 6 are provided in the feed lines connected to these ends of cylinder units 7 where admission of fluid effects retraction of the sole mould rams 2, with manually-adjustable choke valves 8 and are also connected through restrictor valves 9 to a sequence valve 10 which is in circuit with the sole mould cylinder units 3 and the control valves 6. A pressure reducing valve 11 is interposed between the pressure fluid main 12 and solenoid valve 4.

The timer 5 is adapted to be put out of action when an electrical cut-out switch 13 is operated by retraction of one of the sole mould rams 2, an indicator lamp 14 being included in circuit with switch 13; a manual start-stop switch 15 is in circuit with both the timer 5 and the cut-out switch 13. The sequence valve 10 functions to ensure that the side moulds 1 are fully closed before the sole mould rams 2 are moved to sole pressing positions, and valve 10 thus cooperates with solenoid valves 6 which are under control of the timer 5.

The timer 5, of any suitable electrical form, is brought into operation by making manual switch 15 and after the lapse of a predetermined time period (for instance, one minute) the timer 5 operates to energise the solenoids of valves 6 to effect appropriate displacement of the spools of said valves against the resistance of bias springs. Fluid under pressure from the sequence valve 10 is then directed via the solenoid valves 6 and the manually adjustable choke valves 8 to appropriate ends of cylinder units 7 to retract the sole mould rams 2, fluid from the other ends of the cylinder units 7 being exhausted to a common return line via the solenoid valves 6 and restrictor valves 9.

The restrictor valves 9 operate to regulate the rate of movement of the sole mould rams 2 and may be of any suitable form, for instance, they may incorporate interchangeable fixed diameter capillary tubes. At the end of the prescribed vulcanising period the timer 5 operates to deenergise the solenoid valves 4 and 6 to allow of rapid opening of the side moulds 1.

Figure 2:
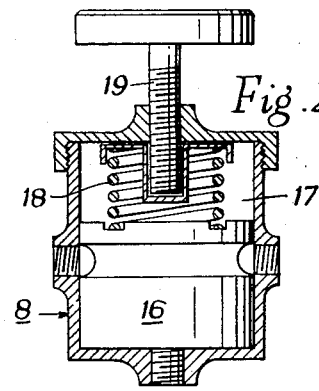

FIGURE 2 illustrates a suitable form of choke valve 8, and comprises a spool 16 in a casing 17, biased by a spring 18 which is hand-adjustable by turning a screw 19. The spool 16 is subject to the pressure of fluid exhausting from cylinder units 7.

Figure 3:
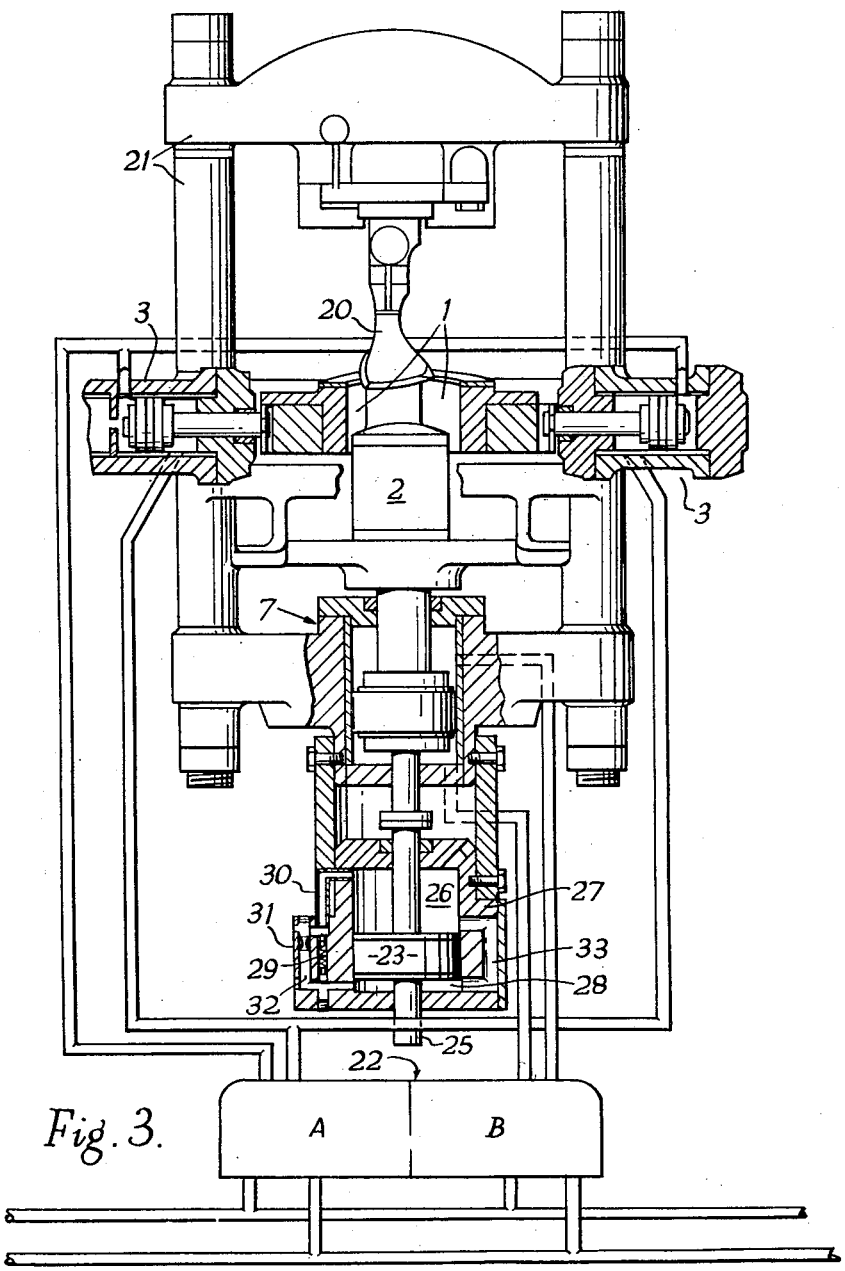

In the embodiment shown in FIGURE 3, the last 20 is suspended from the machine framework 21 and the lower part of an upper assembly supported thereby is adapted to be embraced by side moulds 1 movable by cylinder units 3. The sole mould ram 2 ascends, under fluid pressure applied by cylinder unit 7, for the sole moulding and vulcanising operation.

The sequence valve 10 of the previously described arrangement is omitted, all mould component movements being directly and sequentially controlled by a twin solenoid valve unit 22 comprising valves A and B for controlling the flow of pressure fluid to and exhausting of pressure from the side mould cylinder units 3 and sole mould cylinder units 7 respectively; the solenoid valve unit 22 is under the control of electrical timing circuitry (not shown) similar to that described in connection with FIGURE 1.

In this particular embodiment a secondary piston 23 is associated with the sole mould ram 2 and this piston 23 may be attached to the vertically guided slidable platen 24 on which said ram 2 is mounted or, as shown, may be attached to a tail rod 25 depending from the piston of the cylinder unit 7. In FIGURE 3 the mould components are shown as open and during the closing operation the secondary piston 23 (as it moves in unison with the ram 2) serves to displace fluid from the space 26 in cylinder 27 on the upper side of piston 23 to the space 28 on the lower side of piston 23 via a non-return valve 29 in the passage 30.

Retraction of the valve spool in part B of valve unit 22 reverses the direction of flow of pressure fluid supplied to the sole mould cylinder unit 7 and the descent of the piston in unit 7 is resisted by reason of the attached secondary piston 23 as this seeks to displace fluid from space 28 which by reason of the obstructing action of non-return valve 29 is obliged to escape through a restrictor device 31 (in this case, a constricted throat), in a branch 32 which by-passes valve 29.

The constricted throat 31 is of fixed value and interchangeable restrictors of different throat sizes are employed.

It will be appreciated that some means must be provided to ensure that the sole mould ram 2 descends rapidly at the end of the vulcanising cycle as determined by the associated timer 5 and one such means comprises a by-pass passage 33 in the lower part of cylinder 27. In this case the lineal value of the rate of descent is governed by the relationship and stroke of the piston and by-pass valve arrangement.

Figure 4:
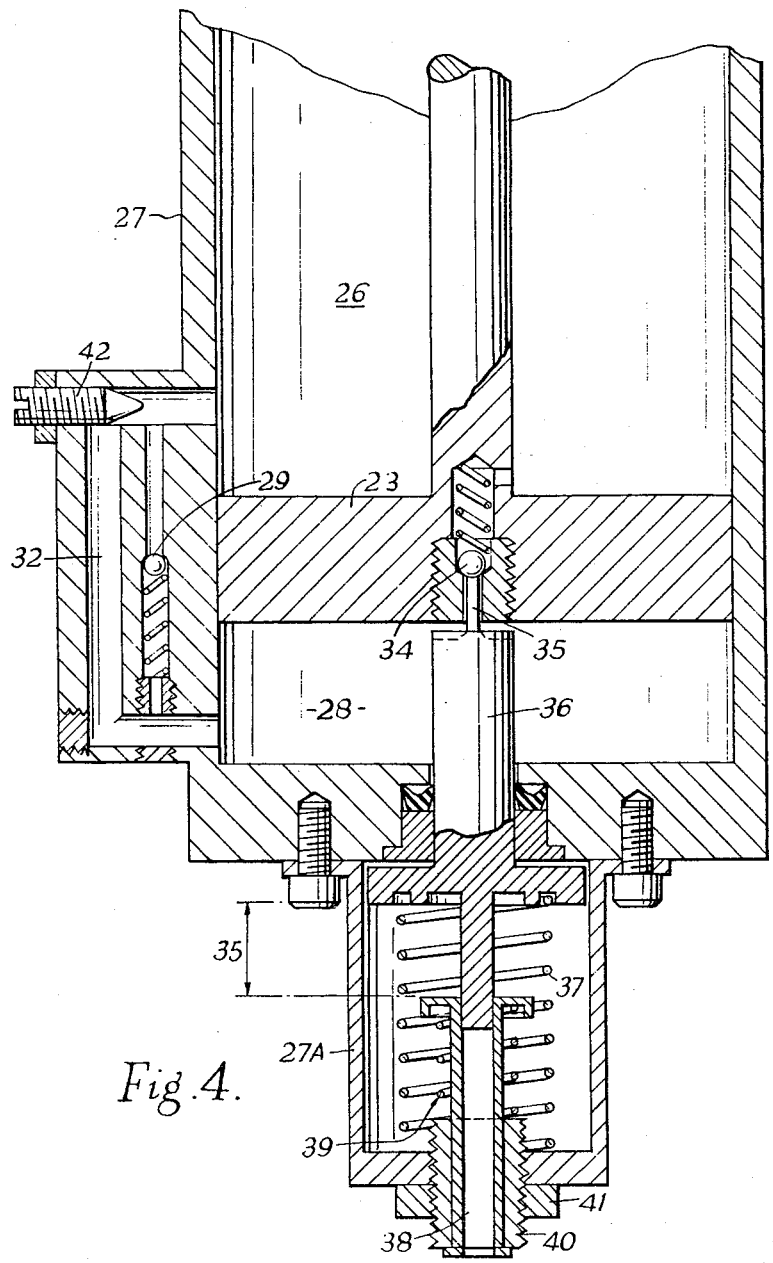

A modified means for ensuring rapid opening of the sole mould ram 2 is shown in FIGURE 4, wherein another non-return valve 34 is carried by the secondary piston 23 and co-operates with a pin 35 extending from the shank of a plunger 36 slidable in the end wall of cylinder 27. The plunger 36 is urged by spring 37 (contained in housing 27A) to follow piston 23 in its inward or ascending stroke, but spring 37 is not sufficiently powerful to overcome the spring-closed valve 34 in piston 23.

At the end of the downstroke of piston 23 and plunger 36, represented by the dimension 35, the plunger 36 by contacting the flanged sleeve 38 encounters additional resistance from spring 39, the combined resistance of springs 37 and 39 being sufficient to open valve 34 and thus to allow of rapid outward movement or descent of piston 23 and the associated ram 2. The resistance value of spring 39 may be varied by adjustment of the screwed brush 40, lockable by nut 41. Instead of using interchangeable restrictors as in FIGURE 4, an adjustable needle valve 42 may be employed.

The alternative form of machine illustrated in FIGURES 4 to 18 inclusive is similar to one of the arrangements already described insofar as concerns the control of unidirectional expansion of the microcellular mass by utilizing the descent of the sole mould piston as a consequence of metering fluid exhausted from the associated cylinder. This further embodiment provides for controlled descent of the sole mould piston responsive to a predetermined translatory movement, namely, the depression of a beam by mechanical means providing the needed displacement, such as by a cam actuated from a constant speed electric motor, the required speed drive being effected through a train of interchangeable gears.

Figure 5:
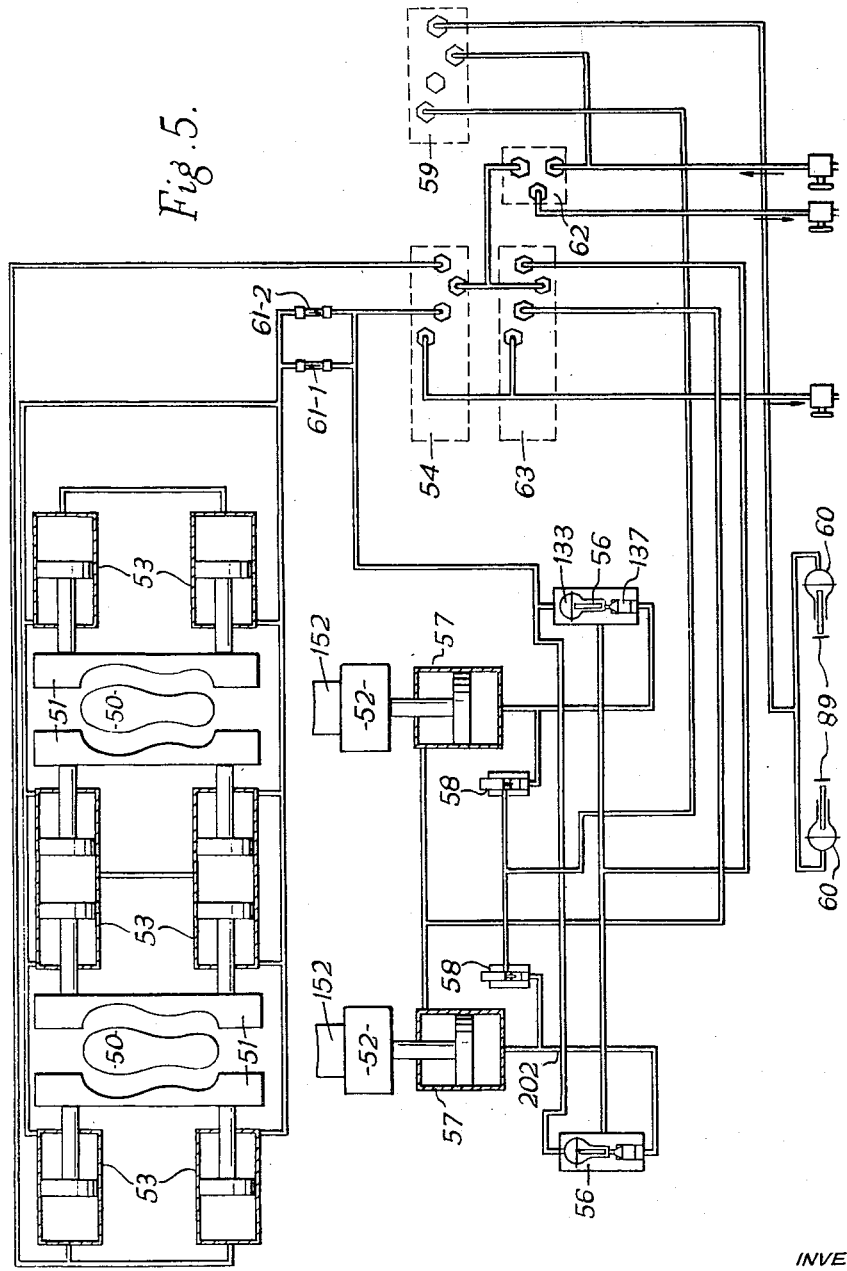
Figure 6:
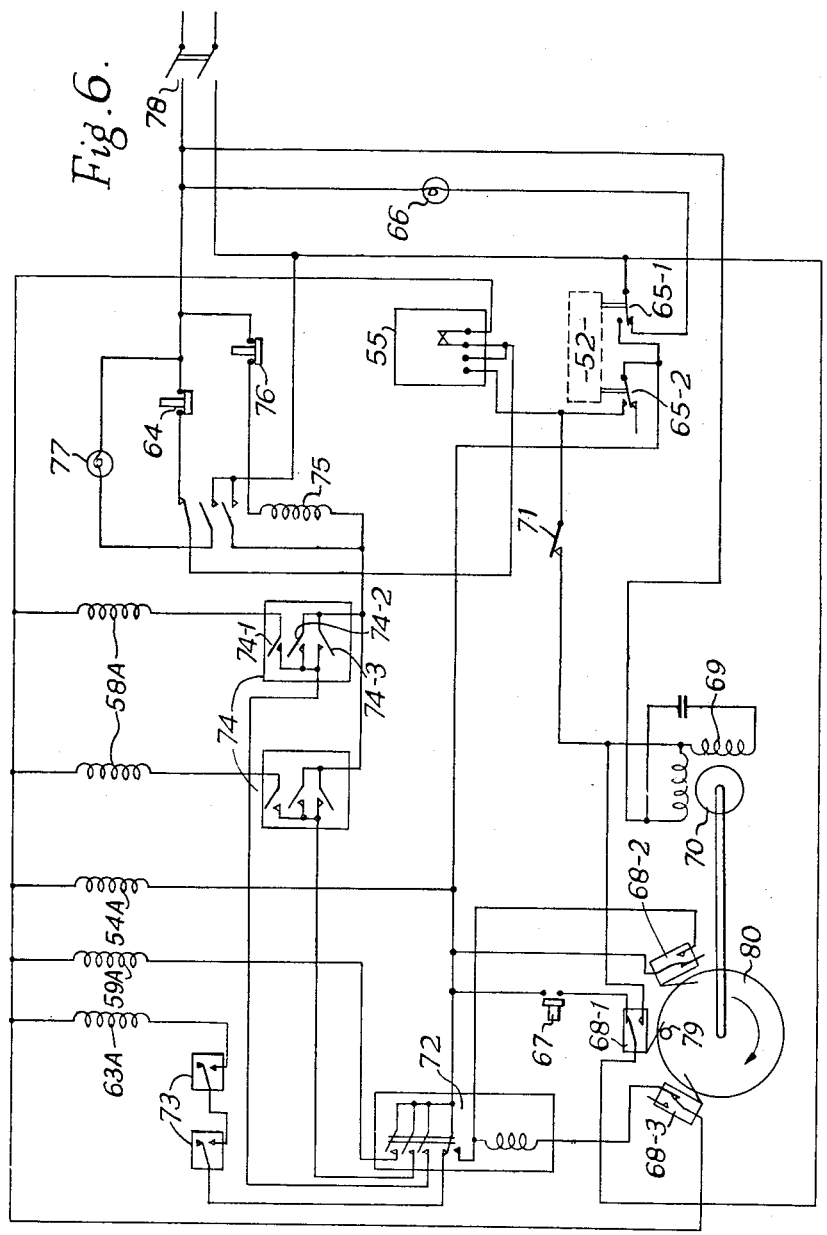

FIGURES 5 and 6 illustrate respectively fluid circuitry and electrical circuitry suitable for a twin-head machine for moulding and simultaneously vulcanising a rubber sole and heel unit to a shoe upper, the mechanical and electrical components employed being shown diagrammatically. Each head embodies components which together provide a sole moulding cavity, said components including a last 50 for supporting a shoe upper assembly, with attached insole or equivalent element (not shown in these figures), a pair of side moulds 51, and a sole mould 152, carried by a ram 52; the components of the machine are not shown in their correct relative or operating positions.

The side moulds 51 for both machine heads are opened and closed by paired, horizontal fluid cylinder units 53 in a manner now well known in the art, fluid flow to the cylinder units 53 being controlled by a common solenoid-operated valve 54 (FIGURE 5) electro-magnetically controlled by a timer 55 (FIGURE 6).

The side mould control valve 54 is also connected to two diaphragm valves 56, one for each machine head and arranged in parallel, and thence to vertical fluid cylinder units 57 adapted to raise and lower the two sole mould rams 52.

The valves 56 are interposed in the pipe lines which connect with those ends of cylinder units 57 where admission of fluid effects elevation of the sole mould rams 52, and are also associated with solenoid-operated control valves 58 adapted to direct fluid via a solenoid-operated clamp control valve 59 to a pair of fluid-operated clamps 60, the purpose of which will be hereinafter described. The clamp control valve 59 receives pressure fluid direct from the pressure main, fluid at reduced pressure being supplied through a reducing valve 62 to the side mould cylinder units 53 via control valve 54 and to the sole mould cylinder units 57 via solenoid-operated control valve 63 and diaphragm valves 56.

The side mould cylinder units 53 are connected to the appropriate control valve 54 through a pair of oppositely-opening check valves 61-1 and 61-2 arranged in parallel. The solenoid operated valves 54, 58, 59 and 63 are all of the known type in which the valve spools are returned to normal by spring pressure.

The timer 55 is adapted to be put out of action either by opening a normally closed push button "stop" switch 64 or when a microswitch 65-1, is operated by descent of one of the sole mould rams 52. A lamp 66 is included in circuit with both of these switches 64, 65-1 to indicate when the machine is in an operating condition, and a manual motor start switch 67 is in series with the timer 55 and the cut-out switch 65-1 and one of a series of operation-stage microswitches, namely switch 68-1. The descent of a sole mould ram 52 also operates a microswitch 65-2, the purpose of which is described later.

It has been found convenient to divide the vulcanisation portion of the machine cycle into three stages, the first stage being effected at high pressure and initiated by operation of microswitch 68-1. Microswitch 68-1 is also connected to the field circuit 69 of an electric motor 70 and to the timer 55 via a manual change-over switch 71. The first operation stage extends between the operation of microswitch 68-1—which is governed by operation of the sole ram switches 65—and the operation of the second operation stage microswitch 68-2.

The second operation stage microswitch 68-2 is connected to a self-holding relay 72 which includes contacts in circuit with a pair of series-connected side mould microswitches 73 and through these with the solenoid 63A of the sole mould control valve 63, with the solenoid 59A of the clamp control valve 59, with the solenoid 54A of the side mould control valve 54 and with a pair of series-connected rate control switches 74.

The two rate control switches 74 (the purpose of which is hereinafter described) are in series respectively with the solenoids 58A of the two solenoid-operated diaphragm valves 58 previously referred to and with a self-holding relay 75 with which is provided a reset push button 76. A fault lamp 77 is shunted across the stop button 64 from one of the contacts of relay 75. A main switch 78 completes the electrical control system.

The three operation stage microswitches 68-1, 68-2 and 68-3 are operated in succession by a pin 79 carried by a disc 80 which is driven by motor 70; in the wiring circuit shown in FIGURE 6 a direct mechanical connection between motor 70 and disc 80 is indicated diagrammatically, but other figures illustrate the speed reduction drive necessarily employed.

In practice the disc 80 is preferably in the form of a disc cam, as shown in FIGURES 7, 8, 12 and 13, which during each revolution operates through a follower roller 81 to depress a rockable beam 83, said roller 81 being freely revolubly mounted on a pin 82 carried by said beam 83. The beam 83 is of U-shape in plan (FIGURES 12 and 14) and is supported at the extremities of its side limbs on trunnions 84 carried by brackets 85 upstanding from a base plate 86. The out-of-balance beam 83 is supported on compression springs 87 acting on the bridge member of the beam through screws 88, which can be adjusted so that the beam may be counterbalanced by said springs and thus held in a poised condition such that it is readily rocked by the light pressure applied during its depression by cam 80.

On the side limbs of beam 83 are mounted the two fluid-operated clamps 60 previously referred to (see especially FIGURE 18), which are adapted to clamp the lower ends of two metal tapes 89 onto anvils 90 carried by the beam 83, each anvil comprising a ball 91 held captive but freely revoluble in a socket in the end of a spindle 92 screwed into a threaded hole 93 in the beam 83.

Each fluid-operated clamp 60 comprises a cylinder 94 and a recessed cover 95 between which is interposed and peripherally secured a rubber or other flexible diaphragm 96, which transmits a displacement through a pin 97 to a plunger 98 biased by a spring 99 to the inoperative position, that is, the "tape-free" position.

The operation stage microswitches 68–1, 68–2 and 68–3 are supported on a carrier block 100 (FIGURES 7, 8, 12 and 15), the middle switch 68–1 being fixed to a plate 101 carrying said block 100 and the outer switches 68–2, 68–3 being suspended respectively on brackets 102, 103 adjustable along an arcuate guide channel 104 provided in block 100. The plate 101, with carrier block 100, brackets 102, 103 and microswitches 68–1, 68–2, 68–3, is conveniently supported as a unit by or adjacent a reduction gear box 105 carried by a mounting base 106, said gearbox 105 having an output shaft 107 adapted to be received in a coupling sleeve 108 on which the disc cam 80 is mounted.

The input shaft 109 of gearbox 105 (FIGURES 8, 15 to 17) extends into a casing 110 and supports a gear wheel 111 which is connected to another and similar gearwheel 112 in said casing through an idler change wheel 113. Change wheel 113 is rotatably carried by a pin 114 on a plate 115 swivel mounted on a pin 116 carried by casing 110 and securable by a clamping screw 117. The change wheel 113 is one of a series of interchangeable wheels which can be used to modify the rate of turning of cam 80. The spindle 118 of gear wheel 112 is coupled by a sleeve 119 to the output shaft 120 of another speed reduction box 121 mounted adjacent and connected to the motor 70.

Each of the tapes 89, referred to above as being clampable to the rockable beam 83, is suspended in slightly offset relationship from a strap 125 (FIGURES 10 and 11) secured by a block 126 mounted on the tail end of the piston rod 127 forming part of the sole ram cylinder unit 57. At the junction between the tape 89 and its associated strap 125 is a cantilever bracket 128 carrying contacts of switch 74, the other contacts of that switch being carried by a bracket 129 fixed in a rate control box 130 also secured to sole ram piston rod 127.

Each of the diaphragm valves 56 (FIGURE 9) comprises a housing 131 and a cover 132 between which is clamped a flexible diaphragm 133 of rubber or any other suitable material, a flat-head plunger 134 resting against said diaphragm to transmit thereto pressure of fluid entering the valve housing by passage 135, in opposition to pressure of fluid entering by passage 136. The tail end of the plunger 134 is adapted to operate a non-return check valve 137 biased to the closed position by spring 138. Each diaphragm valve 56 functions as a by-pass valve to permit rapid opening at the end of the vulcanising period, when the diaphragm 133 is subjected to pressure in excess of the side mould opening pressure, displacement of said diaphragm operating through plunger 134 to shift the non-return check valve 137 to allow of more rapid exhausting of fluid from the sole mould cylinder unit 57.

Assuming the main switch 78 to have been closed (FIGURE 6) resulting in the lighting of "machine-on" lamp 66, the machine cycle is commenced by depression of the "start" button 67 which results in energisation of solenoid 54A of the side mould control valve 54, with consequent movement of side moulds 51 under influence of the cylinder units 53, with the result that the side mould microswitches 73 are operated. This last action results in energisation of solenoid 63A of the sole ram control valve 63, whereupon the sole mold rams 52 (FIGURE 5) are elevated under influence of the cylinder units 57, the rising sole rams 52 operating switches 65 which bring the timer 55 into circuit, whereupon the starting coils 69 of motor 70 are energised and motor 70 begins to turn disc cam 80.

In FIGURE 6 the cam 80 is shown in its normal "at rest" position, that is, in readiness to be turned by motor 70 at the commencement of a machine cycle. The first operation stage already referred to is thus initiated, that is, vulcanising at conventional high pressure and this stage which commences with operation of the sole rams 52 terminates when trip pin 79 on cam 80 trips microswitch 68–2; said microswitch 68–2 being angularly adjustable in relation to microswitch 68–1. The duration of the whole three-stage period is varied by altering the rate of turning of cam 80 in relation to the speed of motor 70, usually by changing the change wheel 113 (FIGURE 17).

When microswitch 68–2 is operated the coil is self-holding relay 72 is energised and the closing of this relay results also in energisation of solenoid 59A of the clamp control valve 59, accompanied by deenergising of solenoid 63A of the sole mould control valve 63.

The resulting movement of the spool of valve 63 effects reversal in the direction of flow of the pressure fluid to bring about lowering of the sole rams. Almost simultaneously the tapes 89, clamped by diaphragm clamp units 60, commence to descend under a pull imposed by the counter-balanced beam 83 which is being rocked downwards on its trunnions 84 by the cam 80 through follower roller 81. The rate control boxes 130 descend with the sole ram piston rods 127 and on the closing of the main contacts 74–1 of switches 74 (due to tilting of cantilever bracket 128 resulting from the off-setting of tape 89 in relation to the associated strap 125) the energisation of solenoids 58A of drain valves 58 causes the sole ram piston to be subjected to unbalanced fluid forces.

The cam 80 is "set" so that the changing contour of the cam edge acts upon beam 83 through follower roller 81 in the second operation stage( namely, between microswitches 68–2 and 68–3) to provide the required kind of control of that period of the vulcanising cycle when unidirectional expansion is permitted by enlarging slightly the volumetric capacity of the moulding chamber; that is, the cam contour may provide for a constant or a variable rate of retraction of sole rams 52. The contacts of switches 74 in the rate control boxes 130, which have been closed by the descending clamped tapes 89, are opened by the return movements of sole rams 52 as the cylinder units 57 thereof seek to restore the balance of fluid pressure upset by operation of the drain valves 58. The switching action in the rate control boxes 130 takes place rapidly so that the movements of the sole rams 52 are substantially continuous in action. If, as a result of failure of the fluid pressure or for any other reason, excessive angular movement of the cantilever bracket 128 occurs then either of the two lower opposite sense auxiliary contacts 74–2, 74–3 will through energisation of relay 75 light up the "fault" lamp 77 and bring in the reset switch 76 which stops the machine.

When eventually trip pin 79 operates microswitch 68–3 the self-holding relay 72 is released and the final stage of vulcanisation is effected under full pressure for a period depending on the angular spacing between microswitches 68–3 and 68–1. Actuation of microswitch 68–1 completes the cycle, the motor 70 being cut-out of circuit and, if the cycle period set by the timer 55 has expired, opening of the moulds is effected. The change-over switch 71 is adapted to isolate the components concerned with unidirectional expansion of microcellular rubber and the like by increase of mould capacity, so that the machine can be used for conventional high pressure moulding.

During reverse flow conditions while vulcanizing exhaust fluid flows via the drain valves 58 but when the operation cycle is completed rapid opening of valves 56 is required, and moreover, the sole mould rams 52 must move in advance of the side moulds 51. The check valve 137 serves to impose a pressure differential on the diaphragm 133 the relatively large diameter of which ensures quick opening of the valve 56 so as not to impede rapid descent of the sole rams 52.

The microswitch 65–2 previously referred to is included for the purpose of isolating the solenoid 54A of the side mould control valve 54 in the event of discontinuance of the supply of current from the power mains, for example as a result of power failure or for any other reason, which could stop the motor 70 with the cam 80 in an intermediate position. In that case re-establishment of the current from the power mains would result in simultaneous energisation of the side mould solenoid 54A and of the motor starting circuit 69, so that the resumed operation of the timing cam 80 provided would be out-of-phase with movement of the mould components. The interposition of microswitch 65–2 prevents this because it is opened by descent of the sole mould ram which would follow automatically from interruption of the mains supply; it is to be understood that on de-energization of the solenoids of the solenoid-operated control valves, these valves revert to normal by reason of the spring bias means employed. Consequent on the cut-out action of microswitch 65–2 the resumption of current operates motor 70 which effects completion of the interrupted revolution of cam 80 until the pin 79 thereon operates microswitch 68–1 to finish the machine cycle. The next cycle is then initiated in usual manner by depression of "start" button 67.

FIGURES 19A, 19B and 19C will now be referred to as illustrating the phenomenon of formation of microcells in a rubber mass during vulcanisation. Pore formation is governed by the temperature required to effect activation of the gassing agent and by the pressure applied; that is, a high pressure will produce very small cells and conversely a lower pressure will allow of the formation of larger cells.

In a shoe sole it is required to secure lightness in weight along with good wearing properties, so that both kinds of cells are necessary, that is, a small cell structure is essential adjacent the wearing surface or tread of the sole while larger cells are suitable between the small tread cells and the opposite surface of the sole where it is bonded to the bottom of the shoe upper.

In production the tread surface $a$ (FIGURE 19A) is the first part of the mass to be heated by reason of contact with the sole mould $b$, but gassing is restricted (in the mode of operation hereinbefore described) by the application initially of an extremely high moulding pressure. The temperature increases upwardly through the mass as the vulcanising period continues and the central zone $c$ reaches gassing temperature. This is the point at which sole mould withdrawal is commenced to permit of the formation of rather large cells (FIGURE 19B). By varying the speed of withdrawal the cell structure may similarly be varied, that is, a very small cell structure at the tread surface $a$ and a larger structure in the central zone $c$, and again smaller cells adjacent to the mould top $d$ (FIGURE 19C), which is equivalent to a suspended last, that is, these smaller cells form at what would be the bonding surface between the shoe upper and the vulcanised sole mass. This latter feature is required to ensure a good bond, since a large cell structure would have a reduced surface area for adhesion. The final application of high pressure controls the size of the cell structure in the bonding area and also speeds the cure by compressing the mass thereby increasing its density and conductivity.

It is believed evident from the foregoing description that in the practice of the invention disclosed herein the control of the expansion of the rubber mass and of the formation of the cell structure therein occurs during the vulcanization of said rubber mass and while it is being subjected in the mould cavity to externally applied vulcanizing pressure and to heat which is both effective to vulcanize the rubber mass and to activate the blowing agent employed and which may be termed "effective heating." This effective heating, as has been indicated, is applied to the rubber mass from one side of the mould, namely, from the sole mould, and therefore is of a unidirectional nature. Thus when in the claims reference is made to effective heating which is unidirectional, such term is used in the sense that the heat is applied from one side only of the mould in order to create what may be said to be a heat front that travels through the rubber mass and is effective to progressively initiate blowing and vulcanizing. It is to be understood however, that such term does not preclude the application of heat which is insufficient to initiate blowing and vulcanizing from other sides of the mould, for instance from the metal last as is common.

It is also believed evident from the disclosure of this application that the portion of the vulcanization period in which occurs such control of expansion of the rubber mass and of formation of cell structure therein, preferably is in the first part of such vulcanization period and that the rubber mass completely fills the mould cavity throughout such vulcanization period. During such first portion of the vulcanization period, the pressure applied to the rubber mass by the mould components and the increase of mould cavity is correlated to the penetration of the effective heating applied unidirectionally to provide the desired for cellular structure in the finished product. Thus as has been indicated, either the expansion of such mould cavity and/or the pressure may be constant or varied to provide either uniform or varied sized cells in the rubber mass and in the latter case, the size of the cells may be substantially uniform in one layer portion of the rubber mass but different from the sizes of the cells in other layer portions of such rubber mass. As has been indicated, this latter type of cell structure is of particular advantage in holding shoe soles to uppers and to provide a good wearing surface.

We claim:

1. The method of molding a mass of thermoplastic material which comprises subjecting a mixture of such thermoplastic material and a gassing agent to heat and pressure in a mold cavity for a given continuous period and in such manner as to produce a stabilized microcellular structure of such treated material, in the cells of which is confined gas under pressures not substantially effecting the dimensional stability of such structure, said mixture in the initial portion of such given period being subjected to constant pressure for a given time while maintaining the mold cavity at a constant volumetric capacity and while subjecting such mixture to an effective gassing temperature applied unidirectionally thereto to cause a differential temperature to travel through such mixture from the side thereof to which such effective heating has been applied, and immediately following the termination of said initial portion of said given period, slightly and very slowly and with positive control increasing the volumetric capacity of the molding cavity at a rate correlated to the size of the cells to be formed in the plastic mass by the formed gas and to the pressure at which the gas is to be retained in such cells in the completed product, and continuing such increase in the molding cavity throughout the duration of a given, at least major portion of the entire length of time of said given period until such volumetric capacity has been increased to substantially the desired final dimensions of the microcellular mass, and at the end of said given period releasing the stabilized completed product from the mold.

2. The method of molding a mass of thermoplastic material which comprises subjecting a mixture of such thermoplastic material and a gassing agent to heat and pressure in a mold cavity for a given continuous period and in such manner as to produce a stabilized microcellular structure of such treated material, in the cells of which is confined gas under pressures not substantially affecting the dimensional stability of such structure, said mixture in the initial portion of such given period being subjected to constant pressure for a given time while maintaining the mold cavity at a constant volumetric capacity and while subjecting such mixture to an effective gassing temperature applied unidirectionally thereto to cause a differential temperature to travel through such mixture from the side thereof to which such effective heating has been applied, and immediately following the termination of said initial portion of said given period, slightly and very slowly and with positive control increasing the volumetric capacity of the molding cavity at a rate correlated to the size of the cells to be formed in the plastic mass by the formed gas and to the pressure at which the gas is to be retained in such cells in the completed product, and continuing such increase in the molding cavity throughout the duration of a given, at least major portion of the entire length of time of said given period until such volumetric capacity has been increased to substantially the desired final dimensions of the microcellular mass, then subjecting the mass at the end of said major portion of said given period during which the molding cavity is expanded, to a high constant pressure for a given time while maintaining the mold cavity at the volumetric capacity substantially conforming to the desired final dimensions of the microcellular mass, and at the end of said given period releasing the stabilized completed product from the mold.

3. The method of molding a mass of thermoplastic material which comprises subjecting a mixture of such thermoplastic material and a gassing agent to heat and pressure in a mold cavity for a given continuous period and in such manner as to produce a stabilized microcellular structure of such treated material, in the cells of which is confined gas under pressures not substantially affecting the dimensional stability of such structure, said mixture in the initial portion of such given period being subjected to constant pressure for a given time while maintaining the mold cavity at a constant volumetric capacity and while subjecting such mixture to an effective gassing temperature applied unidirectionally thereto to cause a differential temperature to travel through such mixture from the side thereof to which such effective heating has been applied, and immediately following the termination of said initial portion of said given period, slightly and very slowly and with positive control increasing the volumetric capacity of the molding cavity at a rate correlated to the size of the cells to be formed in the plastic mass by the formed gas and to the pressure at which the gas is to be retained in such cells in the completed product, and continuing such increase in the molding cavity throughout the duration of a given, at least major portion of the entire length of time of said given period until such volumetric capacity has been increased to substantially the desired final dimensions of the microcellular mass, said increase in the volumetric capacity of the molding cavity being made by withdrawing under positive control the wall of the molding cavity from which said unidirectional effective heating is applied to the mass, and at the end of said given period releasing the stabilized completed product from the mold.

4. The method of molding a mass of thermoplastic material which comprises subjecting a mixture of such thermoplastic material and a gassing agent to heat and pressure in a mold cavity for a given continuous period and in such manner as to produce a stabilized microcellular structure of such treated material, in the cells of which is confined gas under pressures not substantially effecting the dimensional stability of such structure, said mixture in the initial portion of such given period being subjected to constant pressure for a given time while maintaining the mold cavity at a constant volumetric capacity and while subjecting such mixture to an effective gassing temperature applied unidirectionally thereto to cause a differential temperature to travel through such mixture from the side thereof to which such effective heating has been applied, and immediately following the termination of said initial portion of said given period, slightly and very slowly and with positive control increasing the volumetric capacity of the molding cavity at a rate correlated to the size of the cells to be formed in the plastic mass by the formed gas and to the pressure at which the gas is to be retained in such cells in the completed product, and continuing such increase in the molding cavity throughout the duration of a given, at least major portion of the entire length of time of said given period until such volumetric capacity has been increased to substantially the desired final dimensions of the microcellular mass, said increase in the volumetric capacity of the molding cavity being made at a varying rate, and at the end of said given period releasing the stabilized completed product from the mold.

5. The method of molding a mass of thermoplastic material which comprises subjecting a mixture of such thermoplastic material and a gassing agent to heat and pressure in a mold cavity for a given continuous period and in such manner as to produce a stabilized microcellular structure fo such treated material, in the cells of which is confined gas under pressures not substantially effecting the dimensional stability of such structure, said mixture in the initial portion of such given period, being subjected to constant pressure for a given time while maintaining the mold cavity at a constant volumetric capacity and while subjecting such mixture to an effective gassing temperature applied unidirectionally thereto to cause a differential temperature to travel through such mixture from the side thereof to which such effective heating has been applied, and immediately following the termination of said initial portion of said given period, slightly and very slowly and with positive control increasing the volumetric capacity of the molding cavity at a rate correlated to the size of the cells to be formed in the plastic mass by the formed gas and to the pressure at which the gas is to be retained in such cells in the completed product, and continuing such increase in the molding cavity throughout the duration of a given, at least major portion of the entire length of time of said given period until such volumetric capacity has been increased to substantially the desired final dimensions of the microcellular mass, and at the end of said given period releasing the stabilized completed product from the mold by quickly withdrawing the wall of the molding cavity from which said unidirectional effective heating is applied to the mass.

References Cited in the file of this patent

UNITED STATES PATENTS

| Number | Name | Date |
|---|---|---|
| 1,515,475 | Goodwin | Nov. 11, 1924 |
| 1,731,240 | Apfelbaum | Oct. 15, 1929 |
| 1,979,246 | Bast | Nov. 6, 1934 |
| 2,096,338 | Randall | Oct. 19, 1937 |
| 2,354,260 | Haney et al. | July 25, 1944 |
| 2,588,151 | Nelson et al. | Mar. 4, 1952 |
| 2,701,389 | Capdevila | Feb. 8, 1955 |
| 2,763,897 | Gates et al. | Sept. 25, 1956 |
| 2,769,205 | Pfleumer | Nov. 6, 1956 |
| 2,790,996 | Zelik et al. | May 7, 1957 |